UNITED STATES PATENT OFFICE.

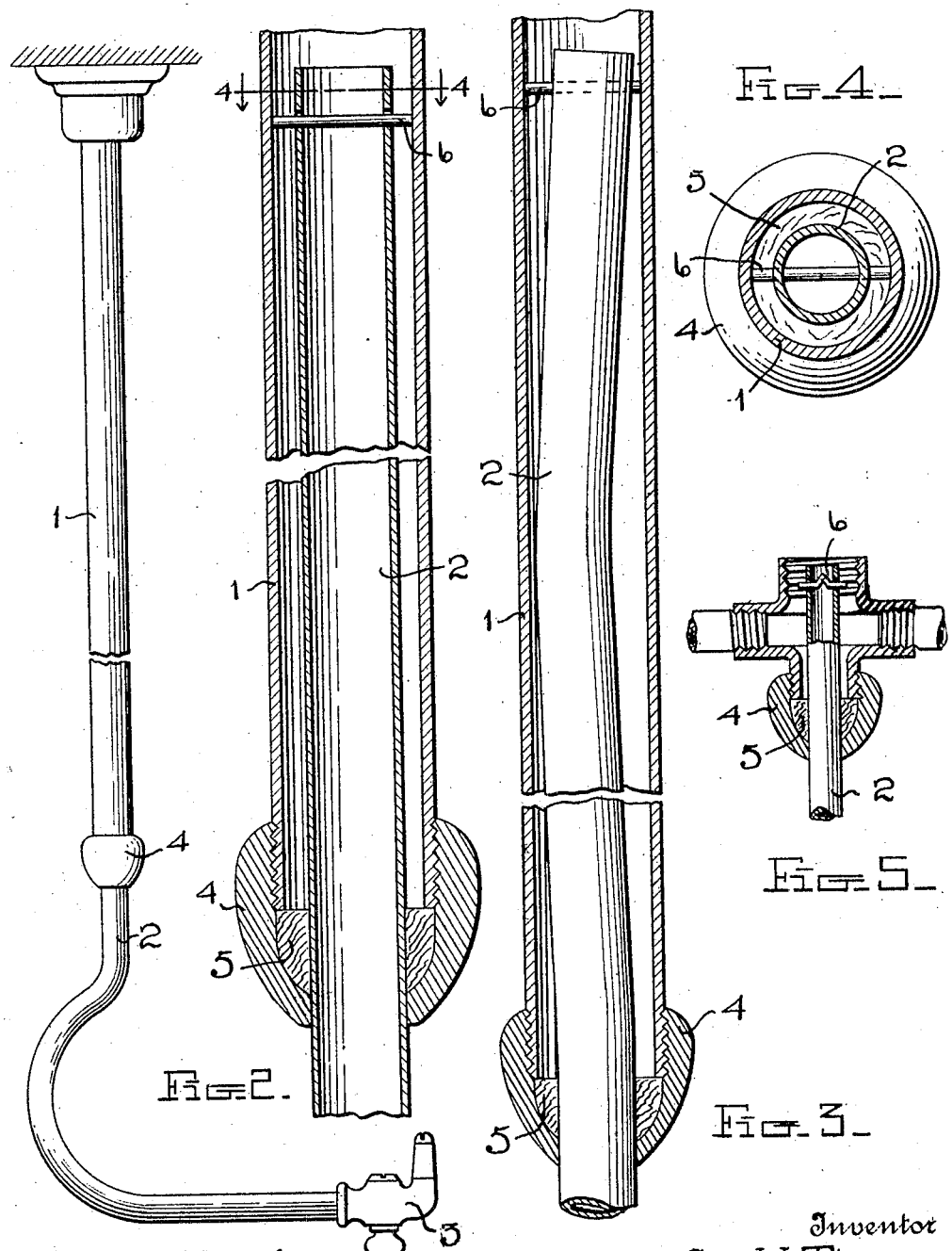

GEORGE W. THORN, OF CHICAGO, ILLINOIS.

EXTENSIBLE GAS-PIPE.

No. 851,569.      Specification of Letters Patent.      Patented April 23, 1907.

Application filed July 19, 1906. Serial No. 326,943.

*To all whom it may concern:*

Be it known that I, GEORGE W. THORN, a citizen of the United States, residing at Chicago, in the county of Cook and State of Illinois, have invented certain new and useful Improvements in Extensible Gas-Pipes; and I do declare the following to be a full, clear, and exact description of the invention, such as will enable others skilled in the art to which it appertains to make and use the same.

This invention relates to improvements in extensible gas pipes or fixtures.

The object of the invention is to provide a pipe or fixture of this character by means of which the burner section of the pipe may be drawn down or extended to any desired distance, means being provided to prevent the binding of the telescoping pipe sections, and means to provide a gas-tight joint or connection between the same.

With the above and other objects in view, the invention consists of certain novel features of construction, combination and arrangement of parts, as will be hereinafter described and claimed.

In the accompanying drawings:—Figure 1 is a side view of an extensible gas pipe or fixture constructed in accordance with the invention; Fig. 2 is an enlarged detail sectional view of a portion of the telescoping pipes, showing the manner in which the same are connected together; Fig. 3 is a similar view, showing the manner in which the stop device for the pipes will operate should the telescoping or inner pipe become bent; Fig. 4 is a cross sectional view on the line 4—4 of Fig. 2; and Fig. 5 is a detail sectional view, showing the arrangement and construction of the pipes and stop pin used in connection with the crossed pipes for supplying more than one burner.

Referring more particularly to the drawings, 1 denotes the outer or main or stationary section of the pipe, which is secured to the wall or ceiling in any suitable manner and into which is adapted to slide or telescope an extensible burner section 2, on the lower end of which is arranged a burner 3 of any suitable description. On the lower end of the upper stationary section 1 of the pipe is arranged a packing gland 4, in which is disposed a suitable packing 5, by means of which an air-tight joint is formed through said section of the pipe.

In the upper end of the inner or telescoping section of pipe are formed oppositely-disposed or alined openings, in which is slidably mounted a stop pin 6. The ends of the pin 6 are adapted to project slightly beyond the ends of the inner section of pipe or to engage the packing in the stuffing box or packing gland 4, thereby limiting the outward movement of the inner section of pipe or preventing the separation of said sections. By providing the inner section of the pipe with a loosely mounted or movable stop pin such as herein shown and described the inner or telescoping portion of the pipe will be permitted to have slight play within the outer section and thus preventing the binding of said inner section, should the same become bent or canted in any direction, this action of the pin being clearly illustrated in Fig. 5 of the drawing.

In Fig. 5 of the drawings is shown a modified arrangement of the pin 6. In this instance the same is bent to form a V-shaped angle within the inner tube, thereby preventing the slipping out or loosening of the pin when the telescoping sections of the pipe are used in connection with the crossed pipes for supplying gas to more than one burner.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. An extensible gas pipe or fixture comprising a stationary section and an extensible section slidably mounted in said stationary section, a stuffing box or packing gland arranged on the lower end of said stationary section, and a transversely-disposed element loosely mounted in the upper end of the extensible section to limit the outward movement of the same, substantially as described.

2. An extensible gas pipe or fixture comprising a stationary section, an extensible section slidably mounted therein, a stuffing box or packing gland arranged at the lower end of the stationary section, and a transversely-disposed element loosely mounted in the upper end of the extensible section and adapted to bear at its terminals against the inner wall of the stationary section, whereby to permit the extensible section to be operated even when bent or otherwise distorted.

In testimony whereof I have hereunto set my hand in presence of two subscribing witnesses.

GEORGE W. THORN.

Witnesses:
 CHARLES RINGER,
 HAYDEN RINGER.